United States Patent [19]

Okano

[11] Patent Number: 5,504,818
[45] Date of Patent: Apr. 2, 1996

[54] INFORMATION PROCESSING SYSTEM USING ERROR-CORRECTING CODES AND CRYPTOGRAPHY

[76] Inventor: Hirokazu Okano, 1-8-6, Kurakake, Asakita-Ku, Hiroshima-shi, Hiroshima, Japan

[21] Appl. No.: 315,846

[22] Filed: Sep. 30, 1994

Related U.S. Application Data

[63] Continuation of Ser. No. 849,736, Mar. 12, 1992, abandoned.

[30] Foreign Application Priority Data

| Apr. 19, 1991 | [JP] | Japan | 3-116753 |
| Jul. 31, 1991 | [JP] | Japan | 3-215909 |
| Dec. 20, 1991 | [JP] | Japan | 3-355858 |

[51] Int. Cl.⁶ .................................................. H04L 9/00
[52] U.S. Cl. ........................... 380/49; 380/4; 380/23; 371/111
[58] Field of Search .................... 380/4, 23, 25, 380/28, 30, 43, 44, 45, 46, 47, 49, 52; 371/41

[56] References Cited

U.S. PATENT DOCUMENTS

| 4,133,973 | 1/1979 | Bransome. | |
| 4,633,036 | 12/1986 | Hellman et al. | 380/30 |
| 4,654,853 | 3/1987 | Moriyama et al. | 371/41 |
| 4,742,215 | 5/1988 | Daughters et al. | 380/25 X |
| 4,809,327 | 2/1989 | Shima | 380/44 X |
| 5,016,274 | 5/1991 | Micali et al. | 380/30 X |
| 5,031,181 | 7/1991 | Sako et al. | 371/41 |
| 5,054,066 | 10/1991 | Riek et al. | 380/30 |
| 5,073,932 | 12/1991 | Yossifor et al. | 371/41 X |
| 5,073,934 | 12/1991 | Matyas et al. | 380/30 |
| 5,263,158 | 11/1993 | Janis | 380/4 X |
| 5,276,901 | 1/1994 | Howell et al. | 380/4 X |

*Primary Examiner*—David C. Cain
*Attorney, Agent, or Firm*—Koda and Androlia

[57] ABSTRACT

An information processing system using error-correcting codes and/or cryptography for processing and transmitting data including documents, drawings, images, and data bases includes a mechanism by which optional portions of data can be selected on a display screen and be assigned reliability and/or security levels, making possible the setting of access authority levels for optional portions of data. All or each optional portion of data within items or files can be processed and enciphered. Cipher text can be displayed on a screen. Then a security system being superior to man-machine interface is provided. For example, a company president can thus access secret data without that data being accessible to information managers and secretaries.

50 Claims, 11 Drawing Sheets

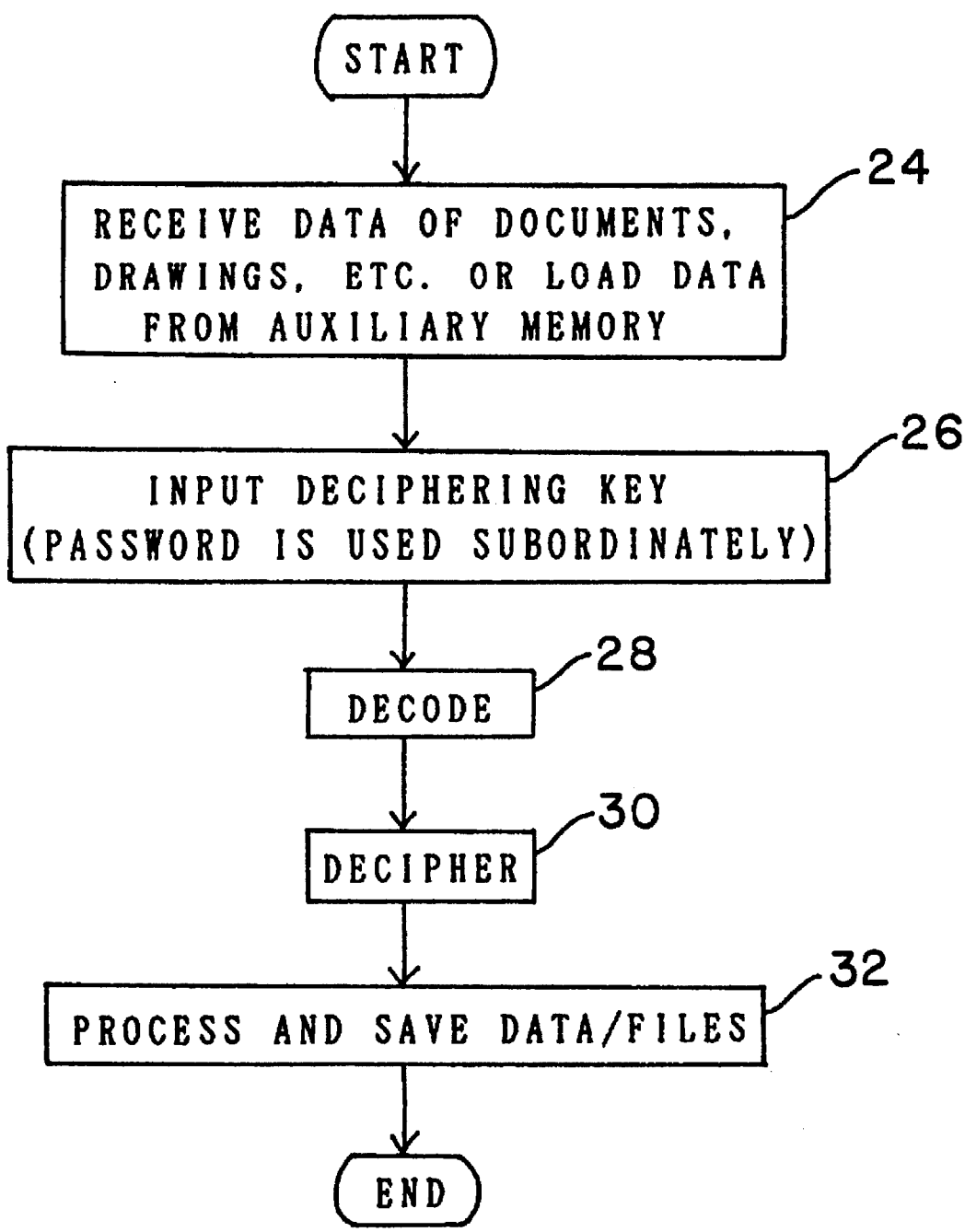

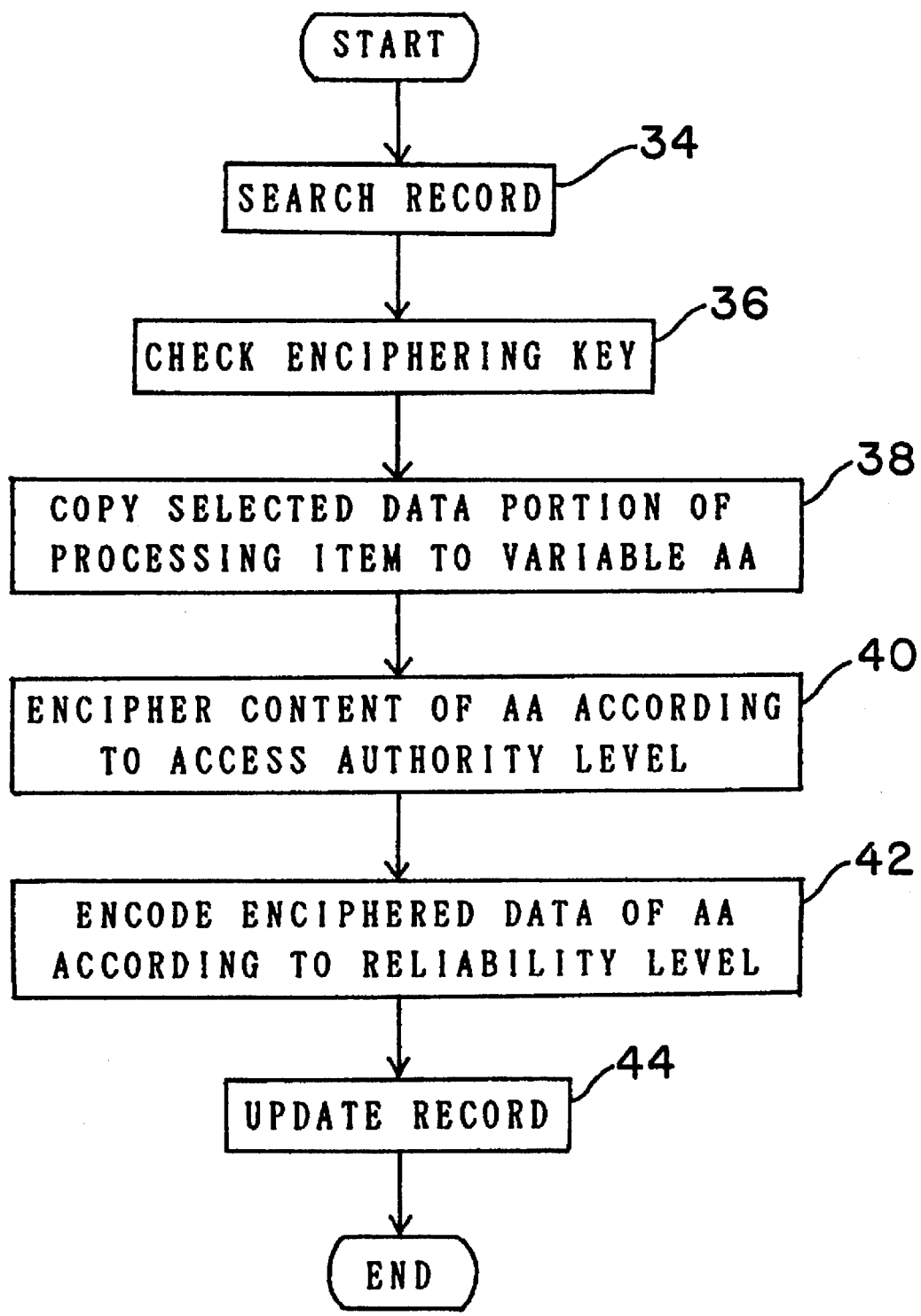

FIG.5

```
data base XDB
screen
{
staff number        [sn0                    ]
department/section  [sn1                    ]
name                [sn2                    ]
result              [sn3]
judgement           [sn4]
basis/other         [sn5                                        ]
enciphered:result   [sn6                                        ]
enciphered:judgement[sn7                                        ]
enciphered:other    [sn8                                        ]
}
end
tables
personnel
attributes
sn0 = personnel.staff_num;
sn1 = personnel.dep_sec;
sn2 = personnel.name;
sn3 = personnel.result;
sn4 = personnel.judgement;
sn5 = personnel.other;
sn6 = personnel.enciphered_result, comments = "no change";
sn7 = personnel.enciphered_judge, comments = "no change";
sn8 = personnel.enciphered_other, comments = "no change";
instructions
after editadd editupdate of result
     call angou(3,6)
after editadd editupdate of judgement
     call angou(4,7)
after editadd editupdate of other
     call angou(5,8)
     nextfield=sn0
end
```

FIG.6

```
STAFF NUMBER          [0001
DEPARTMENT/SECTION    [BUSINESS-DEPT.NO.1
NAME                  [THOMAS ARMSTRONG
RESULT                [A   ]
JUDGEMENT             [B   ]
BASIS/OTHER           [NEW PRODUCT |LUCKY| WAS DEVELOPED BY HIM  ]
ENCIPHERED:RESULT     [sn6                                       ]
ENCIPHERED:JUDGEMENT  [sn7                                       ]
ENCIPHERED:OTHER      [sn8                                       ]
```
3

```
STAFF NUMBER          [0001
DEPARTMENT/SECTION    [BUSINESS-DEPT.NO.1
NAME                  [THOMAS ARMSTRONG
RESULT                [^   ]
JUDGEMENT             [^   ]
BASIS/OTHER           [NEW PRODUCT |^^^^^| WAS DEVELOPED BY HIM  ]
ENCIPHERED:RESULT     [783AC82F3EB2587A                          ]
ENCIPHERED:JUDGEMENT  [369EF81A65B7C38C                          ]
ENCIPHERED:OTHER      [NEW PRODUCT |145AB78F96CA365A| BY HIM IS GOOD]
```
4

Dear Mayor:

We at the James Co., Ltd., would like to see the
continuing development of New York City.  To help
in that effort, we would like to pledge our utmost
cooperation.  The sum shown below is the bid we
would like to submit.  We look forward to hearing
from you soon.

Subject:      |Civic Center building cost|
     Bid:          |10  million dollars|
     Bidder:       |James Co., Ltd.|

Thank you.
```

```
                                            March 1, 1992

Dear Mayor:

We at the James Co., Ltd., would like to see the
continuing development of New York City.  To help
in that effort, we would like to pledge our utmost
cooperation.  The sum shown below is the bid we
would like to submit.  We look forward to hearing
from you soon.

Subject:      |^^^^^^^^^^^^^^^^^^^^^^^^^^|
     Bid:          |^^^^^^^^^^^^^^^^^^^|
     Bidder:       |^^^^^^^^^^^^^^^|

Thank you.

##*c0fb4ce93914a9b8511cad18025b65a1acd58c1e8ad7ea75
  0b93dd54de34811d76201905e2344d8d462633bb358c5711*#
```

FIG.10

DOCUMENT NUMBER: A-50
MARCH 1, 1992

(MESSAGE "M")

7
8

| SIGNATORY | DIGITAL SIGNATURE |
|---|---|
| SENDER (CENTER) | #(H(M),SECTION,NAME,DOCUMENT NUMBER, DATE/TIME,MESSAGE)# |
| MEMBER A | 〃 |
| MEMBER B | 〃 |
| MEMBER C | 〃 |

/ # INFORMATION PROCESSING SYSTEM USING ERROR- CORRECTING CODES AND CRYPTOGRAPHY

This is a continuation of application Ser. No. 07/849,736, filed Mar. 12, 1992 now abandoned.

TECHNICAL FIELD

This invention relates to information processing systems using error-correcting codes and cryptography for processing and transmitting data including electronic documents, drawings, images, and data bases.

BACKGROUND ART

When transmitting information such as documents, drawings, images, or data bases, the data must be transmitted without error and without being wire-tapped by a third party. To accomplish the former objective, error-correcting code technology is used; for the latter, cryptographic technology.

One type of error-correcting code is the block code. Block codes correct errors in transmitted codes by adding redundancy check bits to a given length of information bits. High-correction-capacity error-correcting codes are supplemented by adding even longer check bits. Consequently, data requiring high reliability use high-correction-capacity error-correcting codes, which in turn require longer check bits. Error-correcting capacity involves both correction and detection. The Reed-Solomon code is one such code. The principle of these techniques can be found in "Error-Correcting Codes" by W. W. Peterson and E. J. Weldon, Jr., 2nd ed.,pp. 269–309, MIT press, Cambridge, Massachusetts, 1972.

With tile increasing number of computer end users, sharing of common system resources such as files, programs, and hardware and the increasing use of distribution systems or networks, larger and more complex computer base information systems are being created. Therefore, wiretapping has become simpler, making tile use of encryption devices necessary to prevent it.

Cryptography deals with methods by which message data called plain text is enciphered into unintelligible data called cipher text and by which the cipher text is deciphered back into plain text. The encipherment/decipherment transformations are carried out by a cipher algorithm controlled in accordance with a cipher key. The publication "Block Cipher System for Data Security" is described in U.S. Pat. No. 3,958,081 issued May 18, 1976. The algorithm described therein was adopted by the National Bureau of Standards as a data encryption standard (DES) algorithm and is described in detail in the Federal Information Processing Standards publication, Jan. 15, 1977, FIPS PUB 46. The DES is a 64-bit block encipherment algorithm. A similar code is the FEAL-8 . This algorithm is described in "Fast Data Encipherment Algorithm FEAL-8 by S.Miyaguchi, A. Shiraishi, and A. Shimizu, REVIEW of the Electrical Communication Laboratories, Vol. 36, No.4, pp. 433–437, 1988.

In addition to the above symmetrical encipherments (in which both enciphering and deciphering keys are equal), asymmetrical public-key encipherments (for example, RSA) also are in use. The latter encipherments are for message authentification, in other words, they are used to acknowledge the sender of a message. They can also be used in digital signature algorithms. For example, a digital signature method that utilizes the RSA encipherment works as follows. First, signatory A uses one-way function H to generate H(M) from message M. Then signatory A, using a secret encipher key, enciphers H(M) to create a digital signature, and then sends that signature along with message M to addressees B, C, etc. Addressees B, C, etc. utilize public deciphering keys to change the digital signature into plain text. If the plain text is produced correctly, the message sender, A, can be accurately identified. Furthermore, with a one-way function, H(M) can be easily calculated; however, the computation of M from H(M) is difficult. This function is used to detect unauthorized changes in message M. RSA encipherment is described in "A Method for Obtaining Digital Signatures and Public-key Cryptosystems," Communications of the ACM, Vol. 21, No. 2, pp. 120–126 (1978).

These techniques are superior and are applied in such areas as electronic documents, data bases, and IC cards. This invention uses these techniques as its foundation. Adoption of these techniques does not, however, limit the invention; the invention can apply various types of error-correcting codes and encrypting techniques.

Information security measures are indispensable. The transmission and processing of information such as secret documents, drawings, images, and data bases is mainly accomplished after line level encipherment or full text file encipherment.

Next, the detection and correction of errors produced during actual data transmission is accomplished with error-correcting codes. Normally, a record utilizes a type of error-correcting codes. Methods of using error-correcting codes with relation to the importance of words has been proposed in "A Mapping Scheme of Error-Correcting Codes According to Importance of Natural language Words," written by T. Sasaki, R. Kohno, and H. Imai in the 1990 Autumn National Convention Record, The Institute of Electronics, Information and Communication Engineers, part 1, p.162, Oct. 15, 1990 (in Japanese).

Also, computer management of filing and data bases is accomplished with access control through passwords, with access authority being given for each file, record, and field. That is, to perform an operation such as read/write of a file, the user must first input the password. After that is registered, the right to utilize the desired information is checked; only upon passing this check is operation approval given to the user.

The publication "Method for Providing Information Security Protocols to an Electronic Calendar" is described in U.S. Pat. No. 4,881,179 issued Nov. 14, 1989. In the method described therein, security classifications are assigned to calendar entries. A calendar owner can then selectively display or print calendar event descriptions having assigned security classifications below a given access level. This method, however, does not use encipherment.

In general, information such as documents, drawings, images, and data bases can be thought of as containing the attributes reliability and confidentiality. For example, money requires a high degree of reliability, whereas a simple greeting requires only minimal reliability; in other words, an amount of error is permitted. Furthermore, security protection may be required for a certain time period, such as when protecting the sales price and period of new product. In a case such as this, a high degree of security would probably be demanded. Conventional data transmission and processing have ignored reliability and confidentiality attributes possessed by each portion of data and encoded or enciphered the data in a lump. As a consequense, intellectually efficient data transmission and processing, which utilizes the informational attributes of data, cannot be realized and processing speed decreases.

Also, data records are enciphered in each field. Users cannot, however, freely change those enciphered fields nor can they select and encipher a certain portion of given field's data on the screen, for example. Further, when a document is to be enciphered and transmitted, it is normally enciphered after a secretary has completed the document. Similarly, when it is to be line-level enciphered and transmitted, the operator may be able to view the plain text.

Additionally, security managers control these encipherment processes and have access to all encrypted messages. However, it is not desirable for information managers or operators to have access to confidential information such as personnel data bases.

Conventional technology in particular does not process information in accordance with the information' attributes of reliability and/or confidentiality. Another serious problem is the difficulty for the user of getting used to and using the error-correcting codes and/or cryptography. Consequently, a flexible system that uses error-correcting codes and/or cryptography and is superior to man-machine interface cannot be developed.

The present invention implements some methods to overcome the above described problems.

SUMMARY OF THE INVENTION

"A and/or B" mentioned hereinafter represents the three possibilities "A only," "B only," and "A and B".

The present invention is concerned with the transmission and processing of information including documents, drawings, images, and data bases. The operator optionally selects portions of data on a CRT screen or other display device and also determines and sets information attributes: a reliability level from 0 to m ($\geq 0$) and/or a security level from 0 to n ($\geq 0$). Using corresponding error-correcting codes and/or cipherkeys, the operator encodes and/or enciphers, then processes, transmits, and saves the data.

Consequently, it is possible to realize efficient intellectual encoding and enciphering that correspond to the attributes reliability and confidentiality of data. To set up access authority levels that correspond to the level of confidentiality, several cipher keys and encryption methods are available in a text file. To process a set of given access-authorized data using conventional techniques, the user first uses a password, then inputs a cipher key to process the codes. With the present invention, however, the cipher key can be first input, with the password playing a subordinate role. Of course, a password can be first input in the invention, too. Furthermore, by using specified separation symbols on the CRT display, the user sets information attributes for the optional portions of data displayed on the screen.

Here, fields and items normally have names, and a program normally processes data in a field using that name. Alternately, even if a field is made up with specific separation symbols in a record, the number of fields within records is predetermined. In the present invention, however, a completely optional portion of data is chosen with specific separation symbols, and the portion of data is error-correcting encoded and/or enciphered. Therefore, the present invention's method is quite original.

It is therefore an object of the present invention to provide an information processing system, especially a security system, theft uses error-correcting codes and/or cryptography, that is superior to a man-machine interface and is flexible. Another object of the present invention is to provide an intelligent information processing system that transmits and processes data including documents, drawings, images, and data bases. The operator optionally selects portions of data on a CRT screen or other display device and also determines and sets information attributes a reliability level from 0 to m ($\geq 0$) and/or a security level from 0 to n ($\geq 0$). Using corresponding error-correcting codes and/or cipher keys, the operator encodes and/or enciphers, then processes, transmits, and saves the data.

A further object of the present invention is to provide an intelligent information processing system that, using a CRT or other display device, sets reliability and/or security level attributes to optional data items, records, and data items of data bases, electronic calendars, and structured documents; and using corresponding error-correcting codes and/or cryptograhic techniques and cipher keys, executes encoding and/or enciphering.

A still further object of the present invention is to provide an intelligent information processing system that, using a CRT or other display device, sets reliability and/or security level attribute to optional portions of data within optional items of data bases and electronic calendars and structured documents; and using corresponding error-correcting codes and/or cryptographic techniques and cipher keys, executes encoding and/or enciphering.

A still further object of the present invention is to provide an information processing system that, in the transmission and processing of data including documents, drawings, images, and data bases; and with the use of a CRT screen or other display device and also security levels of 0 to n ($\geq 0$); sets security level attributes to the optional portions of data; and using corresponding cryptographic techniques and cipher keys in encipherment, sets access authority levels corresponding to security levels; and with the utilization of cipher keys and not passwords (or using passwords in an auxiliary role), includes a means to limit access to informational parts to a plural number of designated persons.

A still further object of the present invention is to provide an information processing system that, in a system in which documents, drawings, images, etc. are routed to all the members, permits each member to write his signature in an optional (or pre-determined) location of the message, cipher with individual secret cipher keys to create a digital signature, and also decipher the digital signature with a public key.

Additional objects and features of the present invention will appear in the description that follows wherein the preferred embodiments have been set forth in detail in conjunction with the accompanying drawings.

BRIEF DESCRIPTION OF THE DRAWINGS

FIG. 2B is a flowchart of an operation involving error-correcting decoding and deciphering of optional portions of data of documents, drawings, and images.

FIG. 4 is a flowchart of a CRT display screen operation involving enciphering and encoding of all or each portion of data within data base items.

FIG. 5 is an example of a program list of a relational data base with programmed enciphering function.

FIG. 6 presents screens used in the processing of data base enciphering.

FIG. 9 presents screens used in the processing of a document processing system that uses partial enciphering.

FIG.10 is a digital signature screen display.

DESCRIPTION OF THE PREFERRED EMBODIMENT

Figure 1:
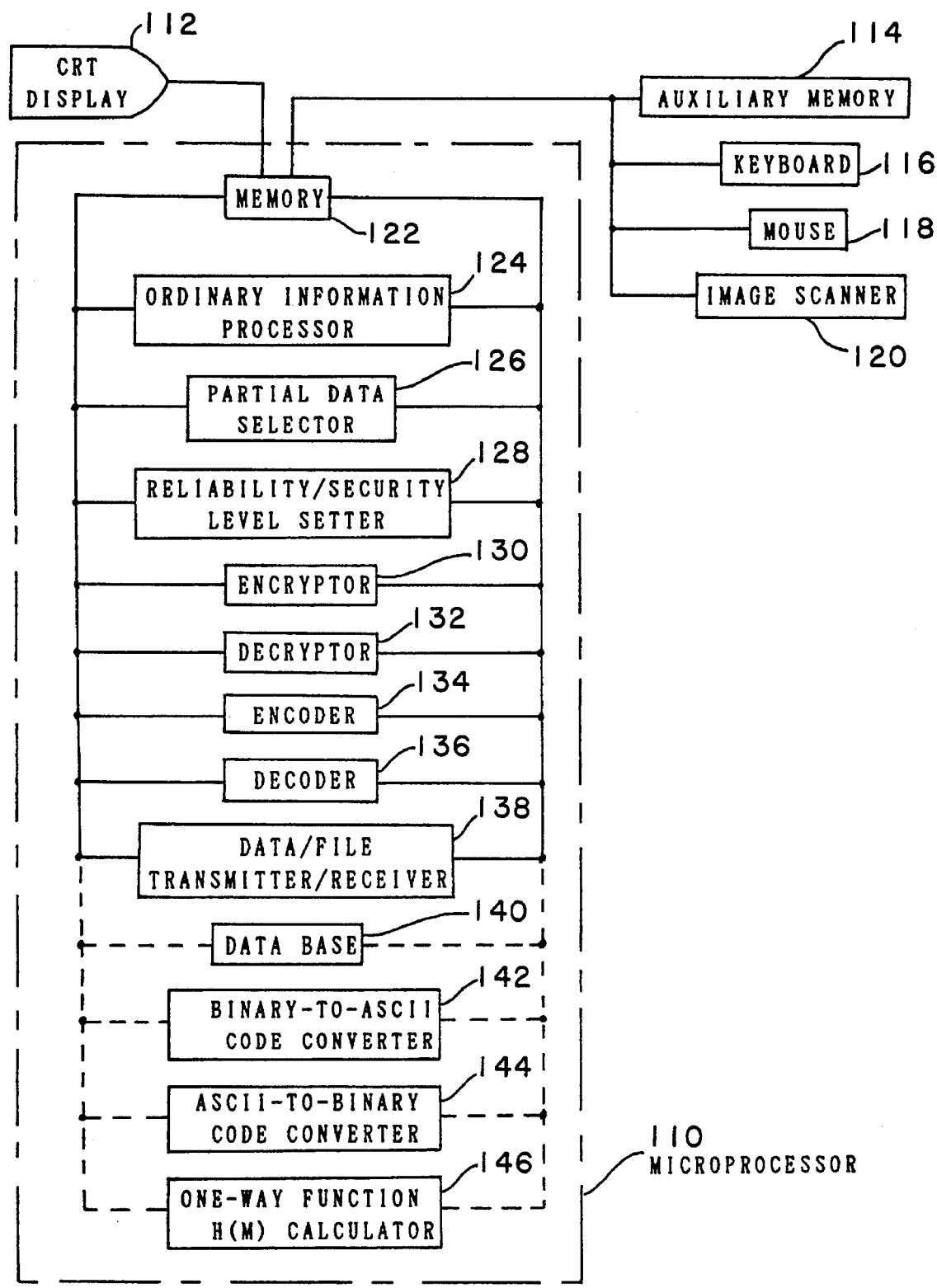
FIG. 1 is a block diagram of the invention's information processing terminal, which uses error-correcting codes and cryptography.

FIG. 1 illustrates the functional components of an information proceesing terminal using error-correcting codes and cryptography. The terminal comprises a microprocessor 110 and several peripheral devices, including CRT display 112, auxiliary memory 114, keyboard 116, mouse 118, and image scanner 120.

The microprocessor 110 processes data according to a control program written into the memory 122. The following is an explanation of the present invention according to functional block.

The operator starts up the ordinary information processor 124 and, utilizing the keyboard 116, mouse 118, and image scanner 120, inputs or generates data such as documents, drawings, images, and data bases. The operator then loads/stores this data into memory 122 and presents it on the CRT display 112. The operator next uses the partial data selector 126 on the CRT display 112 select optional portions of displayed data. With the reliability and security level setter 128, the operator sets informational attributes: a reliability level from 0 to m ($\geq 0$) and/or a security level from 0 to n ($\geq 0$). Actually, these two processes can be executed by inputting specific separation symbols at both ends of the selected optional portion of data. Next, with corresponding encoder 134 and/or encrytor 130, and also error-correcting codes and/or cipher keys, encoding and/or enciphering is executed; with the ordinary information processor 124, necessary data is processed; and with the data and file transmitter/receiver 138, the information is transmitted and then saved.

To return encoded or enciphered data to its previous form, a decoder 136 or decryptor 132 is used. To show cipher text on the display 112, a binary-to-ASCII code converter 142 converts binary codes into ASCII codes. Here, for example, one binary code is into converted two ASCII code bytes by using representation hexadecimal. When deciphering, an ASCII-to-binary code converter 144 converts screen-displayed ASCII codes into binary codes. Data base 140 has a data base operation function. A one-way function H(M) calculator 146 can calculate one-way function values H(M) from message M to make this invention applicable to digital signatures.

Of course, when applying, for example, documentation processing with only cipher, those structured elements in FIG. 1 related to cipher are used but those related to error-correcting codes or data bases are not used. An example of this follows.

Figure 2A:
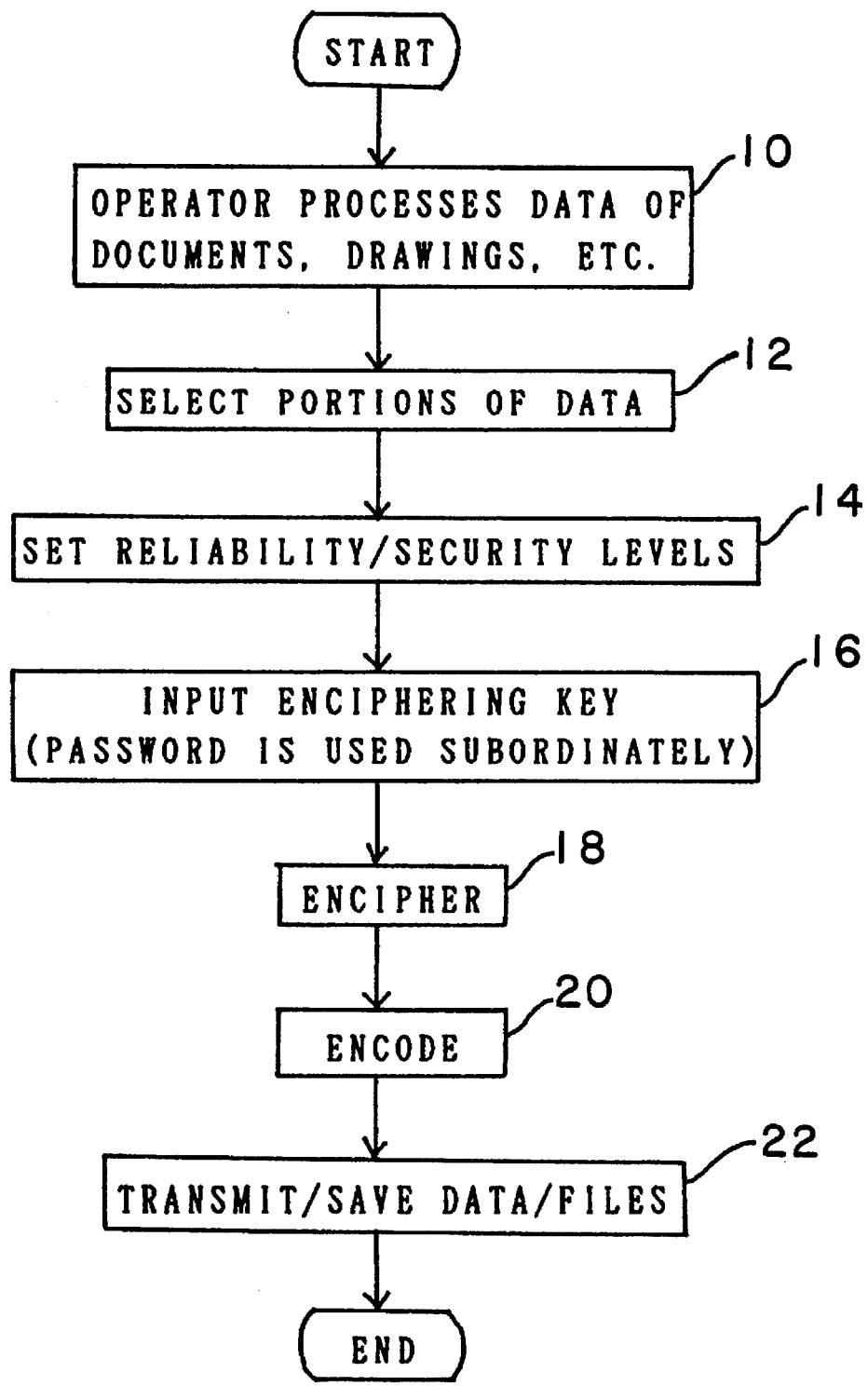
FIG. 2A is a flowchart of an operation involving error-correcting encoding and enciphering of optional potions of data of documents, drawings, and images.

FIG. 2A shows a flowchart of an operation involving error-correcting encoding and enciphering of optional portions of data of documents, drawings, and images. FIG. 2B shows a flowchart of an operation involving error-correcting decoding and deciphering of optional portions of data of documents, drawings, and images.

Transmission (FIG. 2A) operates as follows. In step 10, the operator uses an ordinary information processor 124 to generate and process data, which is then shown on the display 112. In step 12, data is selected and classified with the partial data selector 126. In step 14, the reliability and security level setter 128 sets (on the CRT display 112) the reliability level (0 to m) and security level (0 to n) for each data portion. In step 16, the cipher key is input from the keyboard 116 and a check is performed. In this case, a password, used subordinately, can be input after the cipher key is input. In step 18, the encryptor 130, using cipher keys and cryptography corresponding to the security level, enciphers the data. In step 20, the encoder 134, using error-correcting codes corresponding to the reliability level, encodes the data. In step 22, the data file transmitter/receiver 138 transmits and saves the data.

Receiving (FIG. 2B), on the other hand, operates as follows. In step 24, the data-file transmitter/receiver 138 receives data and files, or the operator loads data from the auxiliary memory 114. In step 26, the cipher key is input and a check performed. In step 28, if the check in step 26 passes, the decoder 136 decodes with the error-correcting codes that correspond to the reliability level. In step 30, the decryptor 132, using cipher keys and cryptography corresponding to the security level, converts the data into plain text. In step 32 (if necessary), the ordinary information processor 124 and data-file transmitter/receiver 138 process the data and save it in the auxiliary memory 114.

To show the cipher text on the display screen, binary codes are converted into ASCII codes; to decipher the data, the screen-displayed ASCII codes are converted into binary codes. This operation is omitted from the above flowchart.

Figure 3:
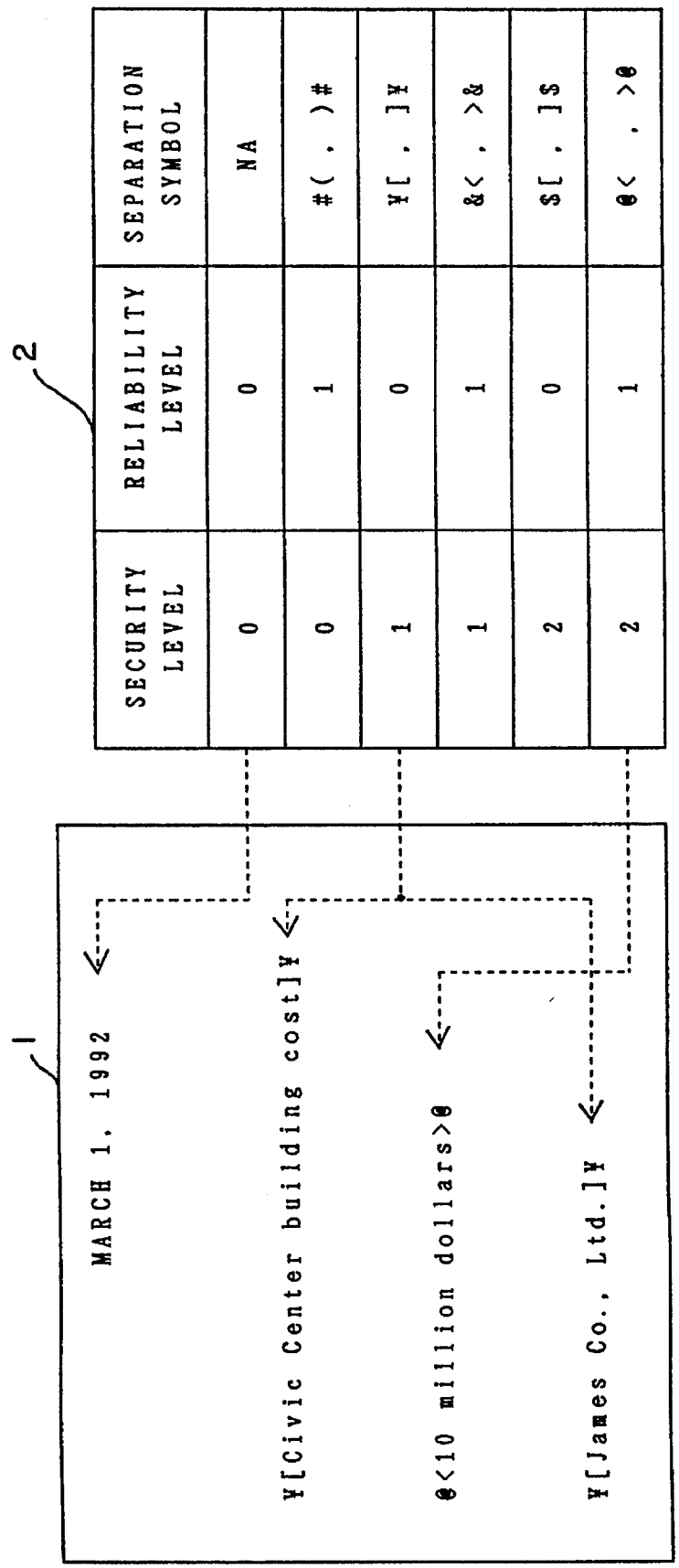
FIG. 3 is a screen presented to set information attributes.

FIG. 3 shows an example of setting informational attritudes on a screen display. On screen 1, separation symbols are used to classify information. For example, if [ , ] is used, the sandwiched part represents a security level of 1 and a reliability level of 0. The informational attribute table (table 2) indicates the attributes corresponding to the separation symbols on screen 1. Because it is not desirable to use separation symbols with drawings and images, a method can be used whereby two coordinates are specified with a mouse or other device; then the attributes can be set for the portions of data indicated by the rectangle diagonal to those. Of course, items can be selected as portions of data without separation symbols.

When the reliability level is 0, the information remains as it is. As the number of the level increases, errors become less acceptable; thus when a check is performed, a long check bit is added. Also, when the security level is 0, the information remains in plain text. As the number of the level increases, information wiretapping and leaks become less tolerable; thus more complicated cipher is used. However, another effective method is to use one reliable cipher type, with only the cipher keys being different. Note that the flowchart shown in FIG. 2 is still valid even if the procedure is not strictly followed. A number of other variations are possible, but are not shown.

The information processing system related to the present invention possesses both reliability and security. A one-bit error in cipher text becomes a several-bit error in plain text. In other words, because encipherment is susceptible to error, the system takes advantage of combining cryptography with error-correcting codes. Of course, a system whereby only one of the two is used is also possible. Here, error-correcting coded data can not be displayed on the screen. Then check bits are stored in a file and connected to pointers.

Although the direct effects of the present invention's information processing system are efficient encoding and enciphering and improved processing speed, other effects (described below) can also be listed.

FIG. 4 is an operation flowchart of a data base applicable to the present invention. As an example, an optional item is enciphered, encoded, and then registered. Here, all or each portion of data within items can be processed and enciphered texts can be displayed on a screen.

The data base 140 in FIG. 1 is used to add a data base function to the present invention. First, in step 34 of FIG. 4, the data base 140 is used to search for data from the data base created. In step 36, a cipher key is input and a check performed; a password can be used subordinately. In step 38, the ordinary information processor 124 is used to copy the content of items needing processing to working variable AA. In step 40, the encryptor 130 enciphers AA with the input encipher key corresponding to the security level. In step 42, the encoder 134 encodes with error-correcting codes corresponding to the reliability level. Then in step 44, the data base 140 updates the enciphered data.

The above example illustrates an enciphering operation. An example of a deciphering operation is omitted because it can be easily understood from the explanation of FIG. 2. If separation symbols are used for enciphering a portion of an item's data, only that portion will be enciphered; in cases without that type of specification, all item content will be enciphered.

FIG. 5 is an example program of a data base having the present invention's cipher function. This program includes screen processing. This data base, in addition to the conventional functions, can utilize a function of C language. Data of items sn0, sn1, and sn2 are not ciphered. However, data of items sn3, sn4, sn5 are ciphered, and all ciphered data is stored in sn6, sn7, and sn8, respectively.

For example, the content of "after editadd edit update of result call angou(3,6)" is processed as follows. First, data is input into sn3 (=result); then, encipher function "angou(3, 6)" enciphers the content of sn3 and stores it in sn6. FIG. 6 shows the CRT screen when the program in FIG. 5 is executed. Screen 3 (before enciphering) becomes screen 4 upon enciphering. Enciphered parts are replaced with "^", the optional portions of the item sandwiched by the "|" symbols are enciphered, and all data of items without "|" are enciphered.

The present invention, when transmitting and processing information such as documents, drawings, images, and data bases; uses security levels of from 0 to n (including a method whereby only 0 or 1 are used) and sets security level attributes to optional portions of data, appearing on a CRT display. Using corresponding enciphering techniques and cipher keys authority for that portion of data, encipherment/decipherment is processed. Furthermore, access levels are set according to the security level. Then, by utilizing cipher keys (passwords can be used subordinately), access to portions of data can be restricted to a specific number of designated persons. In other words, whereas access authority is now given to whole file units or item units, the new concept provides that access is given to optional portions of data within files or items. Moreover, this access authority corresponds to enciphering methods and cipher keys.

For example, for each security level of 0, 1, 2, or 3 is a corresponding access authority level of 0, 1, 2, or 3, which signifies the authority to access the information at that given level. Consequently, a company president, with access authority of 0, 1, 2, and 3, would own level 1, 2, and 3 cipher keys. A director, with access rights of 0, 1, and 2 would own level 1 and 2 cipher keys. Level 0 represents plain text that all persons have access to. Additionally, passwords can be used at the same time. Because the information is partially enciphered, the cipher text can be filed as it is, making information management possible even without giving full access authority to the information manager. A document preparer or the company president can thus have top excess authority.

Figure 7:
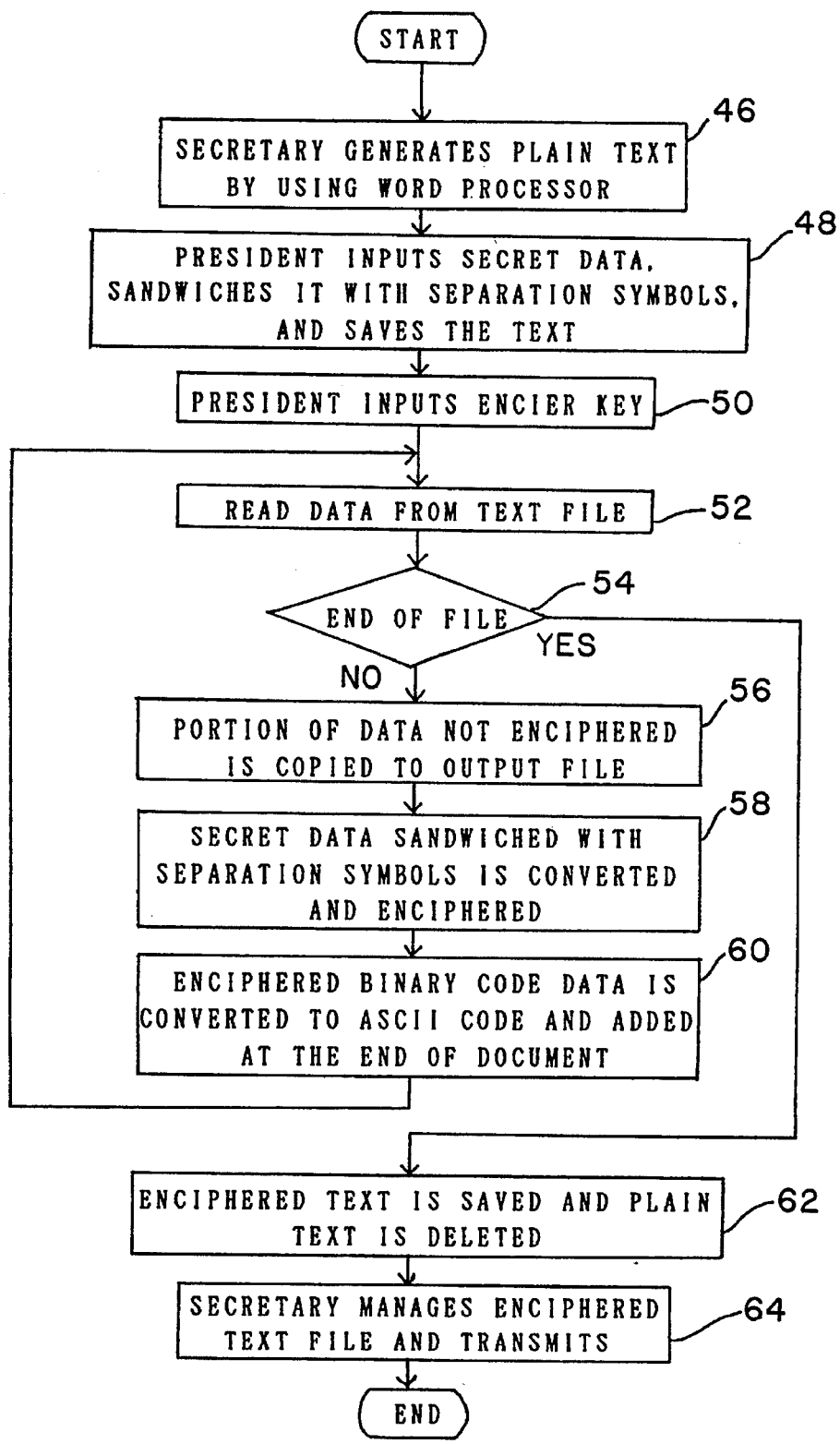
FIG. 7 is a flowchart of a transmitting operation involving a document processing system that uses partial enciphering.
Figure 8:
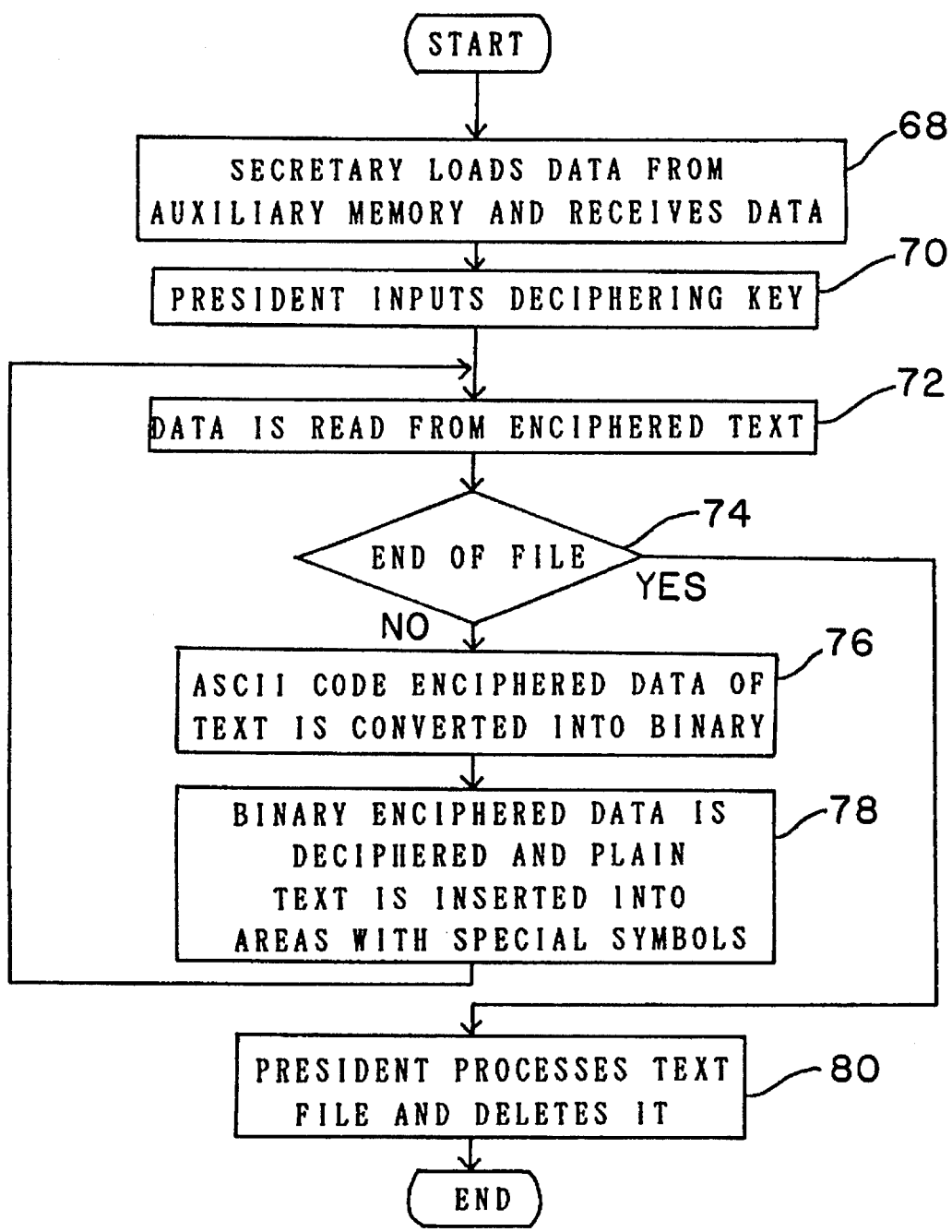
FIG. 8 is a flowchart of a receiving operation involving a document processing system that uses partial enciphering.

Next, the simplest practical example of the present invention, that of a document processing system using partial encipherment, is presented. FIG. 7 is a flowchart showing the operation of the transmission side. FIG. 8 is flowchart showing the operation of the receiving side. FIG. 9 shows the operation appearing on the screen. Here, error-correcting codes are not used. Consequently, the reliability level is 0 only. Furthermore, the security levels are 0 and 1, making the excess authority levels 0 and 1 also.

Because the explanation is made easy to understand, company presidents and secretaries can become the document processing system operators. Secretaries are given the excess authority level of 0, permitting them to process routine documents only. Company presidents are given the excess authority levels of 0 and 1, permitting them to process both routine documents and cipher text.

The following is an example of how this process works. The transmission process begins, as shown in step 46, with the secretary, who, using an ordinary information processor (equivalent to a word processor), generates plain text (screen 5 in FIG. 9). The data can then be stored into the auxiliary memory or may be left on the screen. Next, the company president takes over the operation. In step 48, the president inputs the secret data as plain text and, as shown by screen 5, sandwiches the data by using the separation symbols |,|. The president then temporarily stores the data. In step 50, the president then inputs his/her secret enciphering key. In step 52,the president calls and then enciphers the data from the document file that was stored earlier. In step 56, the portion of data not enciphered is copied as it is into an output file; then in step 58, the secret data sandwiched by |, | symbols is converted into special symbols "^"as shown on screen 6 in FIG. 9, and is then enciphered. Binary mode cipher text can be obtained; however, to be displayed on the screen, the data is converted into ASCII code (step 60) by using the binary-to-ASCII converter 142. As shown by screen 6 in FIG. 9, the data is then added in order after the # and symbols at the end of the document. Processing from steps 52 to 60 is repeated, and encipherment is completed when the document end is detected in step 54. In step 62, the symbols and # are added at the end of the cipher text; the data is stored into the auxiliary memory 114; and the plain text file is deleted. If a document file is to be transmitted, as shown in step 64, the secretary starts up the communications software and transmits the output file (including the cipher text).

Next, the receiving process will be explained. In step 68, if the data is loaded from a diskette, hard disk, or other auxiliary memory 114 or is received, the secretary confirms the plain text portion on a screen such as that of a word processor. In step 70, the company president selects deciphering processing and then inputs his/her secret deciphering key. In step 76,the ASCII-to-binary code converter 144, which converts ASCII characters into binary code, is used to convert the ASCII code cipher text that follows # into binary mode. In step 78, the decryptor 132 deciphers the data,and the plain text is inserted into the areas with the special symbols sandwiched by |, |. Steps 72 thru 78 are repeated; and when the document end is detected in step 74, deciphering is complete. If the cipher text at the end is deleted, the condition returns to that shown by screen 5 in FIG. 9. In step 80, the company president saves the document, starts up the word processor (or applicable device), edits, prints, etc., and, if necessary, deletes the plain text file.

With the preceding operation, a company president can process and send secret data and messages without his/her secretary knowing the content. Furthermore, by programming encipherment/decipherment processing into a word processor or similar device, the user can continue processing with the screen display without having to save each document file. The principles, however, are the same as described heretofore. In addition, an ordinary information processor 124 can be used to select between enciphering and deciphering, to input file names, to check cipher keys, and to perform other processing functions.

This system can also be directly applied to the management of electronic mail, electronic cabinets, data bases, and other systems and individual files.

Also, mail (with included cipher text) can be displayed on electronic bulletin boards, with restoration into plain text being obtainable only by group members possessing cipher keys.

FIG. 10 shows an example of a digital signature screen display. When electronic documents, drawing, etc. are routed to a plural number of members, each member's digital signature is required. On the signature line 8 at the end of the message on the screen, each member places his/her signature between his/her own separation symbols. Public-key encipherment(such as RSA) are used for this signaturing. A secret enciphering key enciphers the data, and other members use public deciphering keys to convert the data into plain text and to confirm the signatories. To guard against changes being made to the message 7, write-protect may be used; however, the content may be changed after the data is copied into a separate file. Therefore, as shown in FIG. 1, a one-way function H(M) calculator 146 is used. As a simple one-way means, 64-bit data can be added by means of EXCLUSIVE OR. By using one-way functional value H(M) as the content of the digital signature, unauthorized changes to the message can be detected. A valid digital signature can be obtained by adding and enciphering the section name, document number, date/time, and a short message. In this case also, the digital signature is converted into ASCII characters so that it can be displayed on the screen. Here, the signature items can be used without using separation symbols, and the signature portion of data may be pro-determined.

As described heretofore, the present invention has realized the following effects:

(1) The user can set reliability/security levels that correspond to the degree of reliability/security required for all or each portion of data within a file or an item (or field); and through the use of corresponding error-correcting codes and/or cryptography, efficient encoding and/or enciphering is made possible.

(2) The user can set access authority levels within files or data items that correspond to the security level; and because the use of cipher keys is restricted to designated persons, access to serect information can be limited to those designated persons.

(3) Access authority to select information can be limited to the document author (company president also possible) or to persons with direct responsibility in the matter, thus making it possible to avoid granting supreme access authority to an information manager.

For example, a company president, once his/her secretary has written the plain text portion of a document, can insert secret text without the secretary knowing its content.

(4) The cryptorahic process can be confirmed on the screen, improving man-machine interface and thus constructing document control systems, data base systems, and other flexible security systems.

Of course, the techniques of the present invention described heretofore can be applied to electronic documents, structured electronic documents, data bases, electronic calendars, IC cards, etc. These techniques can be applied to large computer equipment as well; however, they are particularly effective with hard-to-secure networks, workstations, and personal computers.

A system of the invention can display cipher text on a screen and freely use encipherment at optional portions within items or files. If separation symbols are not desireble to use, item unit encipherment can be used, too. These modificatins may be thought in the scope of the invention. The invention may be embodied in other specific forms from the sprit or essential characteristics thereof. The scope of the invention is indicated by the appended claims rather than by the foregoing description.

What is claimed is:

1. An information processing system which processes data including graphic characters, which are the elements of character text, in one or more items, wherein one or more operators have security levels for said data, using cryptography, comprising:

(a) a memory means connected to a display means and peripheral devices;

(b) an ordinary information processor connected to said memory means for at least one of processing, generating, receiving/transmitting, and loading/saving said data and for displaying said data on a screen of said display means;

(c) a partial data selector connected to said memory means for selecting optional portions of said data consisting of said graphic characters within each of said items of said displayed data on said display means, by using a range-designating method, and for memorizing the positions of said selected portions, so as to allow one or more programs/one or more said operators to specify said selected portions to be ciphered;

(d) a security level setter connected to said memory means for setting n ($\geq 0$, n max $\geq 1$) said security levels to said selected portions, wherein said portions having said security level zero are not enciphered;

(e) an encryptor means connected to said memory means for copying said selected portions to memory buffers and enciphering said selected portions in said memory buffers by using encipher keys determined in accordance with said security levels of said selected portions;

(f) a converter means connected to said memory means for converting said enciphered portions in said memory buffers from a binary mode to a displayable mode which is displayed on said display means;

(g) a data-type keeping and a data storing means connected to said memory means for executing at least one of replacing said selected portions with predetermined displayable symbols and further storing said converted enciphered portions into each of the same said items, and replacing said selected portions with said converted enciphered portions in said displayable mode;

(h) a deconverter means connected to said memory means for copying said converted enciphered portions to said memory buffers and deconverting said converted enciphered portions in said memory buffers from said displayable mode to said binary mode; and (i) a decrypter means connected to said memory means for deciphering said deconverted enciphered portions by using decipher keys determined in accordance with said security levels of said deconverted enciphered portions and returning each of said decrypted portions and deleting said converted enciphered portions.

2. The information processing system of claim 1, wherein said information processing system is a database and said items are fields of a record and said ordinary information processor includes means for processing said database.

3. The information processing system of claim 1, wherein said information processing system is a spreadsheet and said items are cells and said ordinary information processor includes means for processing said spreadsheet.

4. The information processing system of claim 1, wherein said information processing system is a word processor and said items are blocks of a document and said ordinary information processor includes means for processing said word processor.

5. The information processing system of claim 1, wherein said information processing system is an IC card system and said items are zones of an IC card and said ordinary information processor includes means for processing said IC card.

6. The information processing system of claim 1, wherein an unstructured file and a record having only one field are viewed as a single said item, respectively, and each of said items having said graphic characters can have moreover at least one of raster graphics elements which are the elements of images, geometric graphics elements which are the elements of graphics, and sound, and each of said items can be set to have one data type, namely, said graphic characters, only.

7. The information processing system of claim 1, wherein both parts of said partial data selector and said security level setter are executed by inserting special predetermined displayable symbols determined in accordance with said security levels before and after said optional portions.

8. The information processing system of claim 1, wherein both parts of said partial data selector and said security level setter are executed by said range-designating method which uses a mouse and painting said optional portions by the colors determined in accordance with said security levels.

9. The information processing system of claim 1, wherein said security levels are set for said operators of both the center and the terminals of said center has no or part of said encipher/decipher keys, then one or more said operators of said terminals have the highest said security level on a data network, in which said data is accumulated and managed at said center.

10. The information processing system of claim 1, wherein one or more originators of said operators of the same said data can use said encipher keys to encipher said optional portions exclusively in accordance with her/his said security levels and one or more recipients of said operators of the same said data can use said decipher keys to decipher only said enciphered portions corresponding to her/his said security levels.

11. The information processing system of claim 1, wherein said means of (a)–(g) can be used by originators and said means of (h)–(i) can be used by recipients, respectively, in the separated apparatuses.

12. A method in an information processing system which processes data including graphic characters, which are the elements of character text, in one or more items, wherein one or more operators have security levels for said data, using cryptography, said method comprising the steps of:

(A) at one or more originators sides;

(a) processing and editing said data displayed on a screen of a display;

(b) selecting optional portions of said data consisting of said graphic characters within each of said items of said displayed data on said display, by using a range-designating method, and memorizing the positions of said selected portions, so as to allow one or more programs/one or more said operators to specify said selected portions to be ciphered;

(c) setting n ($\geqq 0$, n max $\geqq 1$) said security levels to said selected portions, wherein said portions having said security level zero are not enciphered;

(d) copying said selected portions to the memory buffers and enciphering said selected portions in said memory buffers by using encipher keys determined in accordance with said security levels of said selected portions;

(e) converting said enciphered portions in said memory buffers from a binary mode to a displayable mode which is displayed on said display; and (f) executing at least one of replacing said selected portions with predetermined displayable symbols and further storing said converted enciphered portions into each of the same items, and replacing said selected portions with said converted enciphered portions in said displayable mode; and (B) at one or more recipients sides;

(a) copying said converted enciphered portions to said memory buffers and deconverting said converted enciphered portions in said memory buffers from said displayable mode to said binary mode; and (b) deciphering said deconverted enciphered portions by using decipher keys determined in accordance with said security levels of said deconverted enciphered portions and returning each of said decrypted portions and deleting said converted enciphered portions.

13. The method in an information processing system of claim 12, wherein said information processing system is a database and said items are fields of a record and said step of processing and editing said data includes the step of processing said database.

14. The method in an information processing system of claim 12, wherein said information processing system is a spreadsheet and said items are cells and said step of processing and editing said data includes the step of processing said spreadsheet.

15. The method in an information processing system of claim 12, wherein said information processing system is a word processor and said items are blocks of a document and said step of processing and editing said data includes the step of processing said word processor.

16. The method in an information processing system of claim 12, wherein said information processing system is an IC card system and said items are zones of an IC card and said step of processing and editing said data includes the step of processing said IC card.

17. The method in an information processing system of claim 12, wherein an unstructured file and a record having only one field are viewed as a single said item, respectively, and each of said items having said graphic characters can have moreover at least one of raster graphics elements which are the elements of images, geometric graphics elements which are the elements of graphics, and sound, and each of said items can be set to have one data type, namely, said graphic characters, only.

18. The method in an information processing system of claim 12, wherein both said step of selecting optional portions of said data and said step of setting n ($\geq 0$, n max $\geq 1$) said security levels are executed by inserting special predetermined displayable symbols determined in accordance with said security levels before and after said optional portions.

19. The method in an information processing system of claim 12, wherein both said step of selecting optional portions of said data and said step of setting n ($\geq 0$, n max $\geq 1$) said security levels are executed by said range-designating method which uses a mouse and painting said optional portions by the colors determined in accordance with said security levels.

20. The method in an information processing system of claim 12, wherein said security levels are set for said operators of both the center and the terminals and said center has no or part of said encipher/decipher keys, then one or more said operators of said terminals have the highest said security level on a data network, in which said data is accumulated and managed at said center.

21. The method in an information processing system of claim 12, wherein one or more originators of said operators of the same said data can use said encipher keys to encipher said optional portions exclusively in accordance with her/his said security levels and one or more recipients of said operators of the same said data can use said decipher keys to decipher only said enciphered portions corresponding to her/his said security levels.

22. The method in an information processing system of claim 12, wherein the steps of (a)–(f) in (A) can be used for transmitting and the steps of (a)–(b) in (B) can be used for receiving, respectively, in the separated apparatuses.

23. An information processing system which processes data including graphic characters, which are the elements of character text, in one or more items, wherein one or more operators have security levels for said data, using cryptography, comprising:

(a) a memory means connected to a display means and peripheral devices;

(b) an ordinary information processor connected to said memory means for at least one of processing, generating, receiving/transmitting, and loading/saving said data and for displaying said data on a screen of said display means;

(c) a partial data selector connected to said memory means for selecting optional portions of said data consisting of said graphic characters within each of said items of said displayed data on said display means, by using a range-designating method, and for memorizing the positions of said selected portions, so as to allow one or more programs/one or more said operators to specify said selected portions to be ciphered;

(d) a security level setter connected to said memory means for setting n ($\geq 0$, n max $\geq 1$) said security levels to said selected portions, wherein said portions having said security level zero are not enciphered;

(e) an encryptor means connected to said memory means for copying said selected portions to memory buffers and enciphering said selected portions in said memory buffers by using encipher keys determined in accordance with said security levels of said selected portions;

(f) a data-type keeping and data storing means connected to said memory means for replacing said selected portions with predetermined displayable symbols and storing said enciphered portions into another one or more said items linked to each of said items; and (g) a decrypter means connected to said memory means for copying said enciphered portions to said memory buffers and deciphering said enciphered portions in said memory buffers by using decipher keys determined in accordance with said security levels of said enciphered portions and returning each of said decrypted portions and deleting said enciphered portions in said linked items.

24. The information processing system of claim 23, wherein said (f) data-type keeping and data storing means converts said enciphered portions from binary mode to displayable mode on said display means and stores converted enciphered portions into said linked items, and said (g) decrypter means copies said converted enciphered portions to said memory buffers and deconverts said converted enciphered portions from said displayable mode to said binary mode.

25. An information processing system which processes data including raster graphics elements, which are the elements of images, in one or more items, wherein one or more operators have security levels for said data, using cryptography, comprising:

(a) a memory means connected to a display means and peripheral devices;

(b) an ordinary information processor connected to said memory means for at least one of processing, generating, receiving/transmitting, and loading/saving said data and for displaying said data on a screen of said display means;

(c) a partial data selector connected to said memory means for selecting optional portions, which are selected as the rectangles of optional different sizes, of said data consisting of said raster graphics elements within each of said items of said displayed data on said display means, by using a range-designating method, and for memorizing the positions of said selected portions, so as to allow one or more programs/one or more said operators to specify said selected portions to be ciphered;

(d) a security level setter connected to said memory means for setting n ($\geq 0$, n max $\geq 1$) said security levels to said selected portions, wherein said portions having said security level zero are not enciphered;

(e) an encryptor means connected to said memory means for copying said selected portions to memory buffers and enciphering said selected portions in said memory buffers by using encipher keys determined in accordance with said security levels of said selected portions;

(f) a data-type keeping and data storing means connected to said memory means for replacing said selected portions with colored rectangles which show both the positions and the security levels of said selected portions, and storing said enciphered portions and two coordinates of each of said selected portions into another one or more said items linked to each of said items; and (g) a decrypter means connected to said memory means for copying said enciphered portions to said memory buffers and deciphering said enciphered portions in said memory buffers by using decipher keys determined in accordance with said security levels of said enciphered portions and returning each of said decrypted portions and deleting said enciphered portions in said linked items.

26. An information processing system which processes data including geometric graphics elements, which are the elements of graphics, in one or more items, wherein one or more operators have security levels for said data, using cryptography, comprising:

(a) a memory means connected to a display means and peripheral devices;

(b) an ordinary information processor connected to said memory means for at least one of processing, generating, receiving/transmitting, and loading/saving said data and for displaying said data on a screen of said display means;

(c) a partial data selector connected to said memory means for selecting optional portions of said data consisting of said geometric graphics elements within each of said items of said displayed data on said display means by using range-designating method, which determines said range as a rectangle including whole of said selected portions, so as to allow one or more programs/one or more said operators to specify said selected portions to be ciphered;

(d) a security level setter connected to said memory means for setting n ($\geq 0$, n max $\geq 1$) said security levels to said selected portions, wherein said portions having said security level zero are not enciphered;

(e) an encryptor means connected to said memory means for copying said selected portions to memory buffers and enciphering said selected portions in said memory buffers by using encipher keys determined in accordance with said security levels of said selected portions;

(f) a data-type keeping and data storing means connected to said memory means for replacing said selected portions with colored rectangles which show both the positions and the security levels of said selected portions, and storing said enciphered portions and two coordinates of each of said selected portions into another one or more said items linked to each of said items; and (g) a decrypter means connected to said memory means for copying said enciphered portions to said memory buffers and deciphering said enciphered portions in said memory buffers by using decipher keys determined in accordance with said security levels of said enciphered portions and returning each of said decrypted portions and deleting said enciphered portions in said linked items.

27. An information processing system which processes data of fields in a record of a database system, wherein one or more operators have n ($\geq 0$, n max $\geq 1$) security levels for said fields and have encipher/decipher keys determined in accordance with said security levels, using cryptography, comprising:

a memory means connected to a display means and peripheral devices;

an ordinary information processor connected to said memory means for running an application of said database system and displaying said data of said fields on a screen of said display means and for at least one of receiving/transmitting and loading/saving said data;

means connected to said memory means for establishing each of said security levels to each of said fields, wherein said portions having said security level zero are not enciphered;

means connected to said memory means for selecting one of three intentions of each of said operators, said intentions are:

(a) enciphering said data of each of said fields, (b) deciphering said data of each of said fields, and (c) passing without doing anything, in processing each of said fields having each of said security levels, which is more than one, in said application of said database; and means connected to said memory means for, if selecting said (a) enciphering, receiving each of said encipher keys determined in accordance with each of said security levels of each of said fields from each of said operators and enciphering said data of each of said fields using each of said encipher keys, and if selecting said (b) deciphering, receiving each of said decipher keys determined in accordance with each of said security levels of each of said fields from each of said operators and deciphering said enciphered data of each of said fields using each of said decipher keys.

28. The information processing system of claim 27, wherein one or more parts or the whole of said data of each of said fields are enciphered, and further comprising:

a converter means connected to said memory means for converting said enciphered data of each of said fields from binary mode to displayable mode on said display means, in order to display said enciphered data of each of said fields on said screen for said operators; and a deconverter means connected to said memory means for deconverting said converted enciphered data of each of said fields from said displayable mode to said binary mode.

29. The information processing system of claim 27, wherein said security levels are set for said operators of both the center and the terminals, and said center has no or part of said encipher/decipher keys, then one or more said operators have said highest security level on a data network, in which said data is accumulated and managed at said center.

30. A method in an information processing system which processes data of fields in a record of a database system, wherein one or more operators have n ($\geq 0$, n max $\geq 1$) security levels for said fields and have encipher/decipher keys determined in accordance with said security levels, using cryptography, said method comprising the steps of:

(a) running an application of said database system and displaying said data of said fields on a screen of a display;

(b) establishing each of said security levels to each of said fields, wherein said portions having said security level zero are not enciphered;

(c) accessing and inputting said data of each of said fields;

(d) selecting one of three intentions of each of said operators, said intentions are (1) enciphering said data of each of said fields, (2) deciphering said data of each of said fields, and (3) passing without doing anything, in processing each of said fields having each of said security levels, which is more than one, in said application of said database;

(e) receiving each of said encipher keys determined in accordance with each of said security levels of each of said fields from each of said operators and enciphering said data of each of said fields using each of said encipher keys, if selecting said (1) enciphering; and (f) receiving each of said decipher keys determined in accordance with each of said security levels of each of said fields from each of said operators and deciphering said enciphered data of each of said fields using each of said decipher keys, if selecting said (2) deciphering;

31. A method in an information processing system of claim 30, wherein one or more parts or the whole of said data of each of said fields are enciphered, and further comprising the steps of:

converting said enciphered data of each of said fields from binary mode to displayable mode on said display means, in order to display said enciphered data of each of said fields on said screen for said operators; and deconverting said converted enciphered data of each of said fields from said displayable mode to said binary mode.

32. A method in an information processing system of claim 30, wherein said security levels are set for said operators of both the center and the terminals, and said center has no or part of said encipher/decipher keys, then one or more said operators have said highest security level, on a data network in which said data is accumulated and managed at said center.

33. An information processing system which processes data of fields in a record of a database system, wherein one or more operators have n ($\geq 0$, n max $\geq 1$) security levels for said fields and have encipher/decipher keys determined in accordance with said security levels, using cryptography, comprising:

a memory means connected to a display means and peripheral devices;

an ordinary information processor connected to said memory means for running an application of said database system and displaying said data of said fields on a screen of said display means and for at least one of receiving/transmitting and loading/saving said data;

means connected to said memory means for establishing each of security levels to each of said fields, wherein said portions having said security level zero are not enciphered;

means connected to said memory means for accessing and inputting said data of each of said fields;

a partial data selector connected to said memory means for selecting one or more said optional fields displayed on said display means, so as to allow one or more programs/one or more operators to specify said selected fields to be ciphered, in processing said application of said database;

an encryptor means connected to said memory means for enciphering one or more said selected fields by using encipher keys determined in accordance with said security levels of said selected fields, in processing said application of said database; and a decrypter means connected to said memory means for deciphering one or more said enciphered fields by using decipher keys determined in accordance with said security levels of said enciphered fields, in processing said application of said database.

34. An information processing system which processes data of cells of a spreadsheet system, wherein one or more operators have n ($\geq 0$, n max$\geq 1$) security levels for each of said cells and have encipher/decipher keys determined in accordance with said security levels, using cryptography, comprising:

a memory means connected to a display means and peripheral devices;

an ordinary information processor connected to said memory means for running an application of said spreadsheet system and displaying said data of said cells on a screen of said display means and for at least one of receiving/transmitting and loading/saving said data;

means connected to said memory means for inputting said data of each of said cells;

a partial data selector connected to said memory means for selecting one or more said optional cells displayed on said display means, so as to allow one or more programs/one or more operators to specify said data of each of said selected cells to be ciphered, in processing said application of said spreadsheet;

a security level setter connected to said memory means for setting each of said security levels to each of said selected cells, wherein said portions having said security level zero are not enciphered, in processing said application of said spreadsheet;

an encryptor means connected to said memory means for copying said data of each of said selected cells to one or more memory buffers and enciphering said data in said memory buffers by using each of encipher keys determined in accordance with each of said security levels of each of said selected cells, in processing said application of said spreadsheet;

a converter means connected to said memory means for converting said enciphered data in said memory buffers from binary mode to graphic characters mode, with which said converted data can be stored in said cells on said spreadsheet, in processing said application of said spreadsheet;

a converted data storing means connected to said memory means for returning said converted enciphered data in said memory buffers into each of said selected cells, in processing said application of said spreadsheet;

a deconverter means connected to said memory means for copying said converted enciphered data of each of said selected cells to said memory buffers and deconverting said converted enciphered data in said memory buffers from said graphic characters mode to said binary mode, in processing said application of said spreadsheet;

a decrypter means connected to said memory means for deciphering said deconverted enciphered data in said memory buffers by using each of decipher keys determined in accordance with said security levels of each of said selected cells, in processing said application of said spreadsheet; and a deciphered data storing means connected to said memory means for returning said decrypted data in said memory buffers into each of said selected cells, in processing said application of said spreadsheet.

35. The information processing system of claim 34, wherein said partial data selector selects said optional cells by using a range-designating method and said security level setter writes labels in said cells related to said selected cells, said labels are constructed by predetermined symbols and show said security levels and the enciphered/deciphered states of said selected cells, for using enciphering/deciphering.

36. The information processing system of claim 34, wherein said partial data selector selects said optional cells by using a range-designating method and said security level setter writes the cell numbers of said selected cells in one or more said cells according with each of said security levels and the enciphered/deciphered states of said selected cells, for using enciphering/deciphering.

37. The information processing system of claim 34, wherein said partial data selector comprises means for selecting optional portions of said selected cells, so that said selected optional portions may be enciphered/deciphered, and wherein one or more parts or the whole of said data of each of said fields are enciphered/deciphered.

38. A method in an information processing system which processes data of cells of a spreadsheet system, wherein one or more operators have n ($\geq 0$, n max $\geq 1$) security levels for each of said cells and have encipher/decipher keys determined in accordance with said security levels, using cryptography, comprising:

(A) at one or more originators sides;
  (a) running an application of said spreadsheet system and displaying said data of said cells on a screen of a display;
  (b) inputting said data of each of said cells;
  (c) selecting one or more said optional cells displayed on said display means, so as to allow one or more programs/one or more operators to specify said data of each of said selected cells to be ciphered in processing said application of said spreadsheet;
  (d) setting each of said security levels to each of said selected cells, wherein said portions having said security level zero are not enciphered, in processing said application of said spreadsheet;
  (e) copying each said data of each of said selected cells to one or more memory buffers and enciphering said data in said memory buffers by using each of encipher keys determined in accordance with each of said security levels of each of said selected cells, in processing said application of said spreadsheet;
  (f) converting said enciphered data in said memory buffers from binary mode to graphic characters mode, with which said converted data can be stored in said cells on said spreadsheet, in processing said application of said spreadsheet; and
  (g) returning said converted enciphered data in said memory buffers into each of said selected cells, in processing said application of said spreadsheet; and (B) at one or more recipient sides;
  (a) copying said converted enciphered data of each of said selected cells to said memory buffers and deconverting said converted enciphered data in said memory buffers from said graphic characters mode to said binary mode, in processing said application of said spreadsheet;
  (b) deciphering said deconverted enciphered data in said memory buffers by using each of decipher keys determined in accordance with said security levels of each of said selected cells, in processing said application of said spreadsheet; and
  (c) returning said decrypted data in said memory buffers into each of said selected cells, in processing said application of said spreadsheet.

39. The method in an information processing system of claim 38, wherein said step of selecting selects said optional cells by using a range-designating method and said step of setting each of said security levels writes labels in said cells related to said selected cells, said labels are constructed by predetermined symbols and show said security levels and the enciphered/deciphered states of said selected cells, for using enciphering/deciphering.

40. The method in an information processing system of claim 38, wherein said step of selecting selects said optional cells by using range-designating method and said step of setting each of said security levels writes the cell numbers of said selected cells in one or more said cells, according with each of said security levels and the enciphered/deciphered states of said selected cells, for using enciphering/deciphering.

41. The method in an information processing system of claim 38, wherein said step of selecting one or more said optional cells comprises the step of selecting optional portions of said selected cells, so that said selected optional portions may be enciphered/deciphered, and wherein one or more parts or the whole of said data of each of said fields are enciphered/deciphered.

42. An information processing system using cryptography, which processes data of electronic mails having blocks, comprising:

a memory means connected to a display means and peripheral devices;

an ordinary information processor connected to said memory means for at least one of processing, generating, receiving/transmitting, and loading/saving said data and for displaying said data on a screen of said display means;

a partial data selector connected to said memory means for selecting said optional blocks of said displayed data on said display means, so as to allow one or more program/one or more operator to specify said optional blocks to be ciphered;

a security level setter connected to said memory means for setting n ($\geq 0$, n max$\geq 2$) security levels to said selected blocks;

an encryptor means connected to said memory means for enciphering said selected blocks by using encipher keys determined in accordance with said security levels of said selected blocks, and for allowing a plurality of originators, who have said security levels of said selected blocks, to use said encipher keys in order to cipher exclusively said selected blocks; and a decrypter means connected to said memory means for deciphering said enciphered blocks by using decipher keys determined in accordance with said security levels of said enciphered blocks, and for allowing some of a plurality of recipients, who have said security levels of said selected blocks, to use said decipher keys in order to decipher exclusively said selected enciphered blocks.

43. An information processing system which processes a document including graphic characters, which are the elements of character text, using digital signature, comprising:

a memory means connected to display means and peripheral devices;

an ordinary information processor connected to said memory means for processing and receiving/transmitting said document, and obtaining one-way function value H(M) of a message of said document;

a converting H(M) means connected to said memory means for converting said one-way function value H(M) from binary mode to displayable mode on said display means;

a writing signature means connected to said memory means for writing each of one or more members' signatures including said converted one-way function value H(M) on each one or more members' signature positions of said document;

a partial data selector connected to said memory means for selecting said each of said members' signature positions from said members' signature positions of said document by using range-designating method and memorizing each of said selected members' signature positions;

an encryptor means connected to said memory means for copying each of said selected members' signatures to memory buffers and enciphering each of said selected members' signatures written in plain text in each of said selected members' positions by using each of members' secret keys;

a converter means connected to said memory means for converting each of said enciphered members' signatures in said memory buffers from binary mode to displayable mode which is displayed on said display means;

a data storing means connected to said memory means for replacing each of said selected members' signature in each of said selected members' signature positions with each of said converted enciphered members' signatures;

a deconverter means connected to said memory means for copying each of said converted enciphered members' signatures to said memory buffers and converting each of said converted enciphered signatures from said displayable mode to said binary mode; and a decrypter means connected to said memory means for deciphering each of said deconverted enciphered members' signatures by using each of members' public keys.

44. The information processing system of claim 43, further comprising:

an authentication means connected to said memory means for reobtaining said one-way function value H(M) of said message of said received document and converting said one-way function value H(M) from binary mode to displayable mode and detecting coincidence of two said one-way function value H(M), the one being stored in said received document and the other being reobtained from said document, and authenticating said each of said members' signatures.

45. The information processing system of claim 43, wherein a circulated document on a data network and an electronic mail are transmitted as said documents.

46. The information processing system of claim 43, wherein a part of said partial data selector is executed by inserting special predetermined symbols before and after each of said members' signature positions.

47. The method in an information processing system which processes a document including graphic characters, which are the elements of character text, using digital signature, comprising the steps of:

(A) at one or more originators sides;
  (a) processing said document and obtaining one-way function value H(M) of the message of said document;
  (b) converting said one-way function value H(M) from binary mode to displayable mode which is displayed on said display means;
  (c) writing each of one or more members' signatures including said one-way function value H(M) on each of one or more said members' signature positions of said document;
  (d) selecting each of one or more said members' signature positions from one or more said members' signature positions of said document by using range-designating method and memorizing each of said selected members' signature positions;
  (e) enciphering one or more said members' signatures written in plain text in each of one or more said members' positions with each of one or more said members' secret keys; and
  (f) converting each of one or more said enciphered signatures from binary mode to displayable mode which is displayed on said display means; and (B) at one or more recipient sides;
  (a) deconverting each of one or more said enciphered signatures from said displayable mode to said binary mode; and
  (b) deciphering each of one or more said members' enciphered signatures with each of one or more said members' public keys.

48. The method in an information processing system of claim 47, further comprising the steps of:

reobtaining said one-way function value H(M) of said message of said received document and converting said one-way function value H(M) from said binary mode to said displayable mode; and detecting coincidence of two said one-way function value H(M), the one being stored in said received document and the other being reobtained from said received document, and authenticating each of said members' signatures.

49. The method in an information processing system of claim 47, wherein a circulated document on a data network and an electronic mail are transmitted as said documents.

50. The method in an information processing system of claim 47, wherein the part of said partial data selector is executed by inserting special predetermined symbols before and after each of said members' signature positions.

* * * * *